United States Patent
Zhou et al.

(10) Patent No.: US 11,989,897 B2
(45) Date of Patent: May 21, 2024

(54) DEPTH MAP GENERATION FROM SPARSE DEPTH SAMPLES IN AN AUGMENTED REALITY ENVIRONMENT

(71) Applicant: International Business Machines Corporation, Armonk, NY (US)

(72) Inventors: Bing Zhou, Rye, NY (US); Sinem Guven Kaya, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 559 days.

(21) Appl. No.: 17/202,839

(22) Filed: Mar. 16, 2021

(65) Prior Publication Data
US 2022/0301205 A1    Sep. 22, 2022

(51) Int. Cl.
G06T 7/55  (2017.01)
G06T 17/20 (2006.01)
G06T 19/00 (2011.01)

(52) U.S. Cl.
CPC ............... G06T 7/55 (2017.01); G06T 17/20 (2013.01); G06T 19/006 (2013.01); *G06T 2207/10028* (2013.01); *G06T 2207/20081* (2013.01); *G06T 2207/20084* (2013.01)

(58) Field of Classification Search
CPC ......... G06T 7/55; G06T 17/20; G06T 19/006; G06T 2207/10028; G06T 2207/20081; G06T 2207/20084; G06T 5/50; G06T 7/50

See application file for complete search history.

(56) References Cited

U.S. PATENT DOCUMENTS

| | | | |
|---|---|---|---|
| 10,410,353 B2 * | 9/2019 | Feng | G06N 3/08 |
| 11,238,604 B1 * | 2/2022 | Baig | G06T 5/005 |
| 11,263,756 B2 * | 3/2022 | Chidlovskii | G06N 20/20 |
| 2013/0127823 A1 | 5/2013 | Diverdi | |
| 2015/0063681 A1 | 3/2015 | Bhardwaj et al. | |

(Continued)

FOREIGN PATENT DOCUMENTS

CN   110660061 A   *   1/2020

OTHER PUBLICATIONS

Yuchen Cao, Lan Hu, Laurent Kneip, Representations and Benchmarking of Modern Visual SLAM systems, Pub Apr. 30, 2020, Sensors 2020, MDPI, Basel, Switzerland (Year: 2020).*

(Continued)

*Primary Examiner* — Nancy Bitar
*Assistant Examiner* — Heath E. Wells
(74) *Attorney, Agent, or Firm* — Amin, Turocy & Watson, LLP

(57) ABSTRACT

Systems, computer-implemented methods, and computer program products to facilitate sparse depth completion with semantic mesh deformation optimization in an augmented reality environment are provided. According to an embodiment, a system can comprise a processor that executes computer executable components stored in memory. The computer executable components comprise a depth completion component that generates a first depth map from an image and sparse depth samples. The computer executable components further comprise a semantic mesh deformation component that performs a semantic mesh deformation process, using the sparse depth samples, to generate a second depth map comprising a defined image accuracy.

20 Claims, 10 Drawing Sheets

(56) References Cited

U.S. PATENT DOCUMENTS

| | | | |
|---|---|---|---|
| 2016/0350930 | A1 | 12/2016 | Lin et al. |
| 2018/0336683 | A1* | 11/2018 | Feng .................... G06T 7/12 |
| 2019/0051056 | A1 | 2/2019 | Chiu et al. |
| 2020/0334894 | A1* | 10/2020 | Long .................. G06T 13/00 |
| 2021/0027536 | A1* | 1/2021 | Fu ....................... G06N 3/08 |
| 2021/0158554 | A1* | 5/2021 | Asawaroengchai .... G06T 7/194 |

OTHER PUBLICATIONS

Liu et al., "Mesh Deformation-based Multi-tissue Mesh Generation for Brain Images", Engineering with Computers vol. 28, 305318, 2012.

Hewer et al., "A hybrid approach to 3D tongue modeling from vocal tract MRI using unsupervised image segmentation and mesh deformation", Interspeech-2014, 418-421, 2014.

Eigen, et al., "Depth Map Prediction from a Single Image using a Multi-Scale Deep Network," arXiv:1406.2283v1 [cs.CV] Jun. 9, 2014, 9 pages.

Eigen, et al., "Predicting Depth, Surface Normals and Semantic Labels with a Common Multi-Scale Convolutional Architecture," arXiv:1411.4734v4 [cs.CV] Dec. 17, 2015, 9 pages.

Mousavian, et al., "Joint Semantic Segmentation and Depth Estimation with Deep Convolutional Networks," arXiv:1604.07480v3 [cs.CV] Sep. 19, 2016, 9 pages.

Laina, et al., "Deeper Depth Prediction with Fully Convolutional Residual Networks," arXiv:1606.00373v2 [cs.CV] Sep. 19, 2016, 12 pages.

Ma, et al., "Sparse-to-Dense: Depth Prediction from Sparse Depth Samples and a Single Image," arXiv:1709.07492v2 [cs.RO] Feb. 26, 2018, 8 pages.

Xu, et al., "Depth Completion from Sparse LiDAR Data with Depth-Normal Constraints," arXiv:1910.06727v1 [cs.CV] Oct. 15, 2019, 11 pages.

Jaritz, et al., "Sparse and Dense Data with CNNs: Depth Completion and Semantic Segmentation," 2018 International Conference on 3D Vision, Authorized licensed use limited to: IBM. Downloaded on Nov. 19, 2020 at 14:47:31 UTC from IEEE Xplore 9 pages.

Kaneko, et al., "MeshDepth: Disconnected Mesh-based Deep Depth Prediction," arXiv:1905.01312v1 [cs.CV] May 3, 2019, 10 pages.

Ma, et al., "Sparse-to-Dense: Depth Prediction from Sparse Depth Samples and a Single Image," 2018 IEEE International Conference on Robotics and Automation (ICRA) May 21-25, 2018, Brisbane, Australia, 8 pages.

Shivakumar, et al., "DFuseNet: Deep Fusion of RGB and Sparse Depth Information for Image Guided Dense Depth Completion," arXiv:1902.00761v2 [cs.CV] Jul. 10, 2019, 8 pages.

Zhang, et al., "Deep Depth Completion of a Single RGB-D Image," Last Accessed: Mar. 8, 2021, 11 pages.

Zhou, et al., "Fine-Grained Visual Recognition in Mobile Augmented Reality for Technical Support," IEEE Transactions on Visualization and Computer Graphics, vol. 26, No. 12, Dec. 2020, 10 pages.

Canny, "A Computational Approach to Edge Detection," IEEE Transactions on Pattern Analysis and Machine Intelligence, vol. PAMI-8, No. 6, Nov. 1986, 20 pages.

De Aguiar, et al., "Marker-less 3D Feature Tracking for Mesh-based Human Motion Capture," Last Accessed: Mar. 8, 2021, 15 pages.

Du, et al., "DepthLab: Real-time 3D Interaction with Depth Maps for Mobile Augmented Reality," © 2020 Copyright held by the owner/author(s). Publication rights licensed to ACM, 15 pages.

Zhu, et al., "Detailed Human Shape Estimation from a Single Image by Hierarchical Mesh Deformation," arXiv:1904.10506v2 [cs.CV] May 8, 2019, 10 pages.

He, et al., "Deep Residual Learning for Image Recognition," arXiv:1512.03385v1 [cs.CV] Dec. 10, 2015, 12 pages.

Hecht, "Lidar for self-driving cars," Optics and Photonics News, 29(1):26-33, 2018.

Huang, et al., "A Joint Calibration Method for the 3D Sensing System Composed with ToF and Stereo Camera," © 2018 IEEE, Proceeding of the IEEE International Conference on Information and Automation Wuyi Mountain, China, Aug. 2018, 6 pages.

Izadi, et al., "KinectFusion: Real-time 3D Reconstruction and InteractionUsing a Moving Depth Camera," UIST'11, Oct. 16-19, 2011, Santa Barbara, CA, USA.Copyright 2011, 10 pages.

Karsch, et al., "Depth Extraction from VideoUsing Non-parametric Sampling," Last Accessed: Mar. 8, 2021, 14 pages.

Kazhdan, et al., "Poisson Surface Reconstruction," Eurographics Symposium on Geometry Processing (2006), (c) The Eurographics Association 2006, 10 pages.

Konrad, et al., "2D-to-3D Image Conversion by Learning Depth from Examples," © 2012 IEEE, 7 pages.

Lee, et al., "Two Algorithms for Constructing a Delaunay Triangulation," International Journal of Computer and Information Sciences, vol. 9, No. 3, 1980, 25 pages.

Liao, et al., "Parse Geometry from a Line: Monocular Depth Estimation with PartialLaser Observation," arXiv:1611.02174v1 [cs.CV] Oct. 17, 2016, 9 pages.

Mur-Artal, et al., "ORB-SLAM2: an Open-Source SLAM System for Monocular, Stereo and RGB-D Cameras," arXiv:1610.06475v2 [cs.RO] Jun. 19, 2017, 9 pages.

Wang, et al., "Pixel2Mesh: Generating 3D Mesh Models from Single RGB Images," arXiv:1804.01654v2 [cs.CV] Aug. 3, 2018, 16 pages.

Ren, et al., "Depth Camera Based Hand Gesture Recognition and its Applications in Human-Computer-Interaction," Article • Dec. 2011 DOI: 10.1109/ICICS.2011.6173545, 6 pages.

Roy, et al., "Monocular Depth Estimation Using Neural Regression Forest," Last Accessed: Mar. 9, 2021, 9 pages.

Russakovsky, et al., "ImageNet Large Scale Visual Recognition Challenge," arXiv:1409.0575v3 [cs.CV] Jan. 30, 2015, 43 pages.

Silberman, et al., "Indoor Segmentation and Support Inferencefrom RGBD Images," https://www.microsoft.com/en-us/research/wp-content/uploads/2016/11/shkf_eccv2012.pdf, ECCV-12 submission ID 1079, Last Accessed: Mar. 9, 2021, 14 pages.

Sorkine, et al., "As-Rigid-As-Possible Surface Modeling," To appear at the Eurographics Symposium on Geometry Processing (2007) © The Eurographics Association 2007 8 pages.

Tan, et al., "EfficientNet: Rethinking Model Scaling for Convolutional Neural Networks," arXiv:1905.11946v5 [cs.LG] Sep. 11, 2020, 11 pages.

Tsuji, et al., "Non-Guided Depth Completion with Adversarial Networks," 2018 21st International Conference on Intelligent Transportation Systems (ITSC)Maui, Hawaii, USA, Nov. 4-7, 2018, 6 pages.

Wang, et al., "Pseudo-LiDAR from Visual Depth Estimation: Bridging the Gap in 3D Object Detection for Autonomous Driving," arXiv:1812.07179v6 [cs.CV] Feb. 22, 2020, 16 pages.

Xu, et al., "Multi-Scale Continuous CRFs as Sequential Deep Networks for Monocular Depth Estimation," arXiv:1704.02157v1 [cs.CV] Apr. 7, 2017, 9 pages.

Zhong, et al., "Deep RGB-D Canonical Correlation Analysis For Sparse Depth Completion," arXiv:1906.08967v3 [cs.CV] Mar. 15, 2020, 11 pages.

Zhou, et al., "Semantic Understanding of Scenes through the ADE20K Dataset," arXiv:1906.08967v3 [cs.CV] Mar. 15, 2020, 11 pages.

Mell, et al., "The NIST Definition of Cloud Computing," Recommendations of the National Institute of Standards and Technology, Special Publication 800-145, Sep. 2011.

* cited by examiner

DEPTH MAP GENERATION FROM SPARSE DEPTH SAMPLES IN AN AUGMENTED REALITY ENVIRONMENT

BACKGROUND

The embodiments described herein relate to augmented reality, and more specifically, to depth map generation from sparse depth samples in an augmented reality environment.

Sparse depth measurements are widely available in many applications such as augmented reality, visual inertial odometry, structure from motion, and robots equipped with low cost depth sensors. Although such sparse depth samples work well for certain applications like motion tracking, a complete depth map is usually employed for broader applications, such as three-dimensional (3D) object recognition, 3D reconstruction, and autonomous driving, where a complete depth map is one that can be generated from incomplete, sparse, and/or noisy depth measurements. Despite the recent advancements in depth prediction from single red-green-blue (RGB) images with deeper neural networks, a problem with existing technologies is that they yield results with limited accuracy and reliability for practical use. Another problem with such existing technologies is that they do not employ a neural network with post-optimization to predict a complete depth map using an RGB image and sparse depth samples as input.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate sparse depth completion with semantic mesh deformation optimization in an augmented reality environment are described.

According to an embodiment, a system can comprise a processor that executes computer executable components stored in memory. The computer executable components comprise a depth completion component that generates a first depth map from an image and sparse depth samples. The computer executable components further comprise a semantic mesh deformation component that performs a semantic mesh deformation process, using the sparse depth samples, to generate a second depth map comprising a defined image accuracy. An advantage of such a system is that it can generate depth maps having better local and global accuracy compared to those generated by existing technologies, thereby facilitating at least one of improved accuracy, improved efficiency, or reduced processing workload associated with generating a depth map.

In some embodiments, the semantic mesh deformation component deforms at least one of: a reconstructed mesh of an object in the image to corresponding sparse depth samples of the object; or one or more second reconstructed meshes of one or more second objects in the image to corresponding second sparse depth samples of the one or more second objects. An advantage of such a system is that it can generate depth maps having better local and global accuracy compared to those generated by existing technologies, thereby facilitating at least one of improved accuracy, improved efficiency, or reduced processing workload associated with generating a depth map.

According to another embodiment, a computer-implemented method can comprise generating, by a system operatively coupled to a processor, a first depth map from an image and sparse depth samples. The computer-implemented method can further comprise performing, by the system, a semantic mesh deformation process, using the sparse depth samples, to generate a second depth map comprising a defined image accuracy. An advantage of such a computer-implemented method is that it can be implemented to generate depth maps having better local and global accuracy compared to those generated by existing technologies, thereby facilitating at least one of improved accuracy, improved efficiency, or reduced processing workload associated with generating a depth map.

In some embodiments, the above computer-implemented method can further comprise deforming, by the system, at least one of: a reconstructed mesh of an object in the image to corresponding sparse depth samples of the object; or one or more second reconstructed meshes of one or more second objects in the image to corresponding second sparse depth samples of the one or more second objects. An advantage of such a computer-implemented method is that it can be implemented to generate depth maps having better local and global accuracy compared to those generated by existing technologies, thereby facilitating at least one of improved accuracy, improved efficiency, or reduced processing workload associated with generating a depth map.

According to another embodiment, a computer program product comprising a computer readable storage medium having program instructions embodied therewith, the program instructions executable by a processor to cause the processor to generate a first depth map from an image and sparse depth samples. The program instructions are further executable by the processor to cause the processor to perform a semantic mesh deformation process, using the sparse depth samples, to generate a second depth map comprising a defined image accuracy. An advantage of such a computer program product is that it can be implemented to generate depth maps having better local and global accuracy compared to those generated by existing technologies, thereby facilitating at least one of improved accuracy, improved efficiency, or reduced processing workload associated with generating a depth map.

In some embodiments, the program instructions are further executable by the processor to cause the processor to deform at least one of: a reconstructed mesh of an object in the image to corresponding sparse depth samples of the object; or one or more second reconstructed meshes of one or more second objects in the image to corresponding second sparse depth samples of the one or more second objects. An advantage of such a computer program product is that it can be implemented to generate depth maps having better local and global accuracy compared to those generated by existing technologies, thereby facilitating at least one of improved accuracy, improved efficiency, or reduced processing workload associated with generating a depth map.

DETAILED DESCRIPTION

Figure 1:
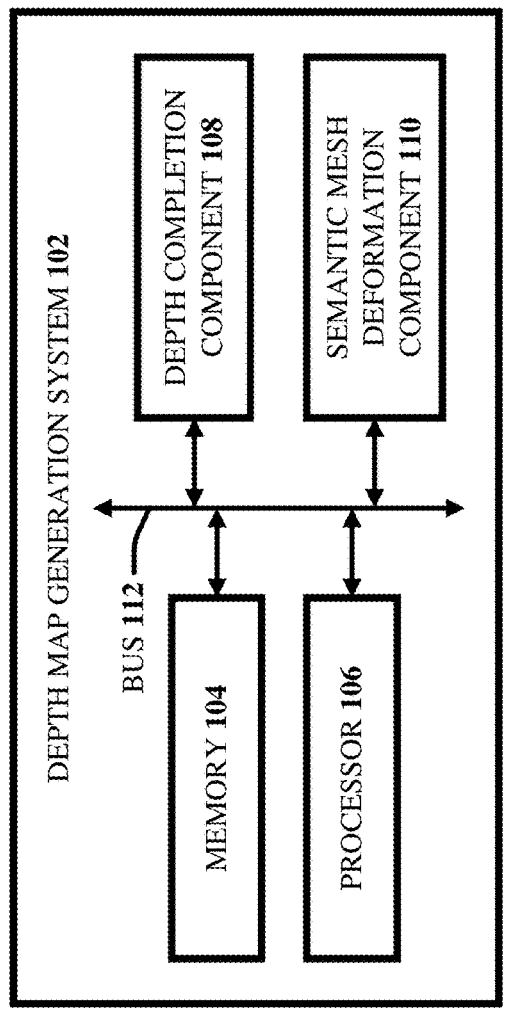
FIGS. 1 and 2 illustrate block diagrams of example, non-limiting systems that can facilitate sparse depth completion with semantic mesh deformation optimization in an augmented reality environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems described above with existing augmented reality technologies, one or more embodiments described herein can be implemented to produce a solution to these problems in the form of systems, computer-implemented methods, and/or computer program products that can facilitate sparse depth completion with semantic mesh deformation optimization in an augmented reality environment by: generating a first depth map from an image and sparse depth samples; and/or performing a semantic mesh deformation process, using the sparse depth samples, to generate a second depth map comprising a defined image accuracy. An advantage of such systems, computer-implemented methods, and/or computer program products is that they can be implemented to generate depth maps having better local and global accuracy compared to those generated by existing technologies, thereby facilitating at least one of improved accuracy, improved efficiency, or reduced processing workload associated with generating a depth map.

Additionally, or alternatively, one or more embodiments described herein can be implemented to produce a solution to the problems described above in the form of systems, computer-implemented methods, and/or computer program products that can further facilitate sparse depth completion with semantic mesh deformation optimization in an augmented reality environment by: deforming a reconstructed mesh of an object in the image to corresponding sparse depth samples of the object and/or deforming one or more second reconstructed meshes of one or more second objects in the image to corresponding second sparse depth samples of the one or more second objects. An advantage of such systems, computer-implemented methods, and/or computer program products is that they can be implemented to generate depth maps having better local and global accuracy compared to those generated by existing technologies, thereby facilitating at least one of improved accuracy, improved efficiency, or reduced processing workload associated with generating a depth map.

As referenced herein, an "entity" can comprise a human, a client, a user, a computing device, a software application, an agent, a machine learning (ML) model, an artificial intelligence (AI) model, and/or another entity.

FIG. 1 illustrates a block diagram of an example, non-limiting system 100 that can facilitate sparse depth completion with semantic mesh deformation optimization in an augmented reality environment in accordance with one or more embodiments described herein. System 100 can comprise a depth map generation system 102. Depth map generation system 102 can comprise a memory 104, a processor 106, a depth completion component 108, a semantic mesh deformation component 110, and/or a bus 112.

It should be appreciated that the embodiments described herein and/or depicted in various figures are for illustration only, and as such, the architecture of such embodiments are not limited to the systems, devices, and/or components depicted therein. For example, in some embodiments, system 100 and/or depth map generation system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 and/or other figures disclosed herein.

Memory 104 can store one or more computer and/or machine readable, writable, and/or executable components and/or instructions that, when executed by processor 106 (e.g., a classical processor, a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to depth map generation system 102, depth completion component 108, semantic mesh deformation component 110, and/or another component associated with depth map generation system 102 as described herein with or without reference to the various figures.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 816 and FIG. 8. Such examples of memory 104 can be employed to implement any embodiments described herein.

Processor 106 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments described herein.

Depth map generation system 102, memory 104, processor 106, depth completion component 108, semantic mesh deformation component 110, and/or another component of depth map generation system 102 as described herein can be communicatively, electrically, operatively, and/or optically coupled to one another via bus 112 to perform functions of system 100, depth map generation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments described herein.

Depth map generation system 102 can comprise any type of component, machine, device, facility, apparatus, and/or instrument that comprises a processor and/or can be capable of effective and/or operative communication with a wired and/or wireless network. All such embodiments are envisioned. For example, depth map generation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Depth map generation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, depth map generation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, depth map generation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Depth map generation system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, depth map generation system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between depth map generation system 102 and external systems, sources, and/or devices (e.g., computing devices, communication devices, and/or another type of external system, source, and/or device).

Depth map generation system 102 can comprise one or more computer and/or machine readable, writable, and/or executable components and/or instructions that, when executed by processor 106 (e.g., a classical processor, a quantum processor, and/or another type of processor), can facilitate performance of operations defined by such component(s) and/or instruction(s). Further, in numerous embodiments, any component associated with depth map generation system 102, as described herein with or without reference to the various figures, can comprise one or more computer and/or machine readable, writable, and/or executable components and/or instructions that, when executed by processor 106, can facilitate performance of operations defined by such component(s) and/or instruction(s). For example, depth completion component 108, semantic mesh deformation component 110, and/or any other components associated with depth map generation system 102 as disclosed herein (e.g., communicatively, electronically, operatively, and/or optically coupled with and/or employed by depth map generation system 102), can comprise such computer and/or machine readable, writable, and/or executable component(s) and/or instruction(s). Consequently, according to numerous embodiments, depth map generation system 102 and/or any components associated therewith as disclosed herein, can employ processor 106 to execute such computer and/or machine readable, writable, and/or executable component(s) and/or instruction(s) to facilitate performance of one or more operations described herein with reference to depth map generation system 102 and/or any such components associated therewith.

Depth map generation system 102 can facilitate (e.g., via processor 106) performance of operations executed by and/or associated with depth completion component 108, semantic mesh deformation component 110, and/or another component associated with depth map generation system 102 as disclosed herein. For example, as described in detail below, depth map generation system 102 can facilitate (e.g., via processor 106): generating a first depth map from an image and sparse depth samples; and/or performing a semantic mesh deformation process, using the sparse depth samples, to calibrate at least one pixel in the first depth map and to generate a second depth map comprising a defined image accuracy.

In the above example, as described in detail below, depth map generation system 102 can further facilitate (e.g., via processor 106): employing a model to generate the first depth map, where the model is trained using a semantic edge-weighted loss function; segmenting the first depth map into semantic depth maps according to semantic segmentation masks; projecting semantic depth maps segmented from the first depth map into a multi-dimensional space and grouping projected semantic depth maps according to segmentation results of the first depth map; reconstructing a mesh of an object in the image and calibrating the mesh independently from one or more second reconstructed meshes of one or more second objects in the image to calibrate at least one pixel in the first depth map and generate the second depth map comprising the defined image accuracy, thereby facilitating at least one of improved accuracy, improved efficiency, or reduced processing workload associated with at least one of a model or the processor in predicting or generating a depth map; deforming a reconstructed mesh of an object in the image to corresponding sparse depth samples of the object and/or deforming one or more second reconstructed meshes of one or more second objects in the image to corresponding second sparse depth samples of the one or more second objects; and/or projecting a deformed reconstructed mesh of the object and/or one or more second deformed reconstructed meshes of the one or more second objects to a multi-dimensional space to generate the second depth map.

In accordance with one or more embodiments described herein, to facilitate one or more of the operations described in the above example, depth map generation system 102 can employ depth completion component 108 and/or semantic mesh deformation component 110. For example, as described in detail below, depth map generation system 102 can employ depth completion component 108 to generate a first depth map from an image (e.g., an RGB image) and sparse depth samples. In this example, depth completion component 108 can employ a model to generate the first depth map, where the model can be trained using a semantic edge-weighted loss function.

In another example, as described in detail below, depth map generation system 102 can employ semantic mesh deformation component 110 to perform a semantic mesh deformation process, using the sparse depth samples, to calibrate at least one pixel in the first depth map and to generate a second depth map comprising a defined image accuracy (e.g., a desired image accuracy and/or a relatively improved image accuracy compared to depth maps generated by existing technologies). In this example, semantic mesh deformation component 110 can segment the first depth map into semantic depth maps according to semantic segmentation masks. In this example, semantic mesh deformation component 110 can project semantic depth maps segmented from the first depth map into a multi-dimensional space and can further group projected semantic depth maps according to segmentation results of the first depth map. In this example, semantic mesh deformation component 110 can reconstruct a mesh of an object in the image and can further calibrate the mesh independently from one or more second reconstructed meshes of one or more second objects in the image to calibrate at least one pixel in the first depth map and generate the second depth map comprising the defined image accuracy, thereby facilitating improved accuracy, improved efficiency, and/or reduced processing workload associated with depth completion component 108, a model (e.g., the model described herein that can be employed by depth completion component 108 to generate the first depth map), and/or a processor (e.g., processor 106) in predicting or generating a depth map. In this example, semantic mesh deformation component 110 can deform at least one of: a reconstructed mesh of an object in the image to corresponding sparse depth samples of the object; or one or more second reconstructed meshes of one or more second objects in the image to corresponding second sparse depth samples of the one or more second objects. In this example, semantic mesh deformation component 110 can project at least one of a deformed reconstructed mesh of the object or one or more second deformed reconstructed meshes of the one or more second objects to a multi-dimensional space to generate the second depth map.

It should be appreciated that each of the above described operations can constitute a discrete operation of an example overall process that can be implemented by depth map generation system 102 in accordance with one or more embodiments described herein. In various embodiments, such an example overall process can comprise two phases: 1) a depth completion phase using an RGB image and sparse data (SD) samples; and 2) a semantic mesh deformation optimization phase. An example of an overal system architechture that can be implemented by depth map generation system 102 to perform one or more of the above described operations in accordance with one or more embodiments described herein is described below and illustrated in FIG. 2.

Figure 2:
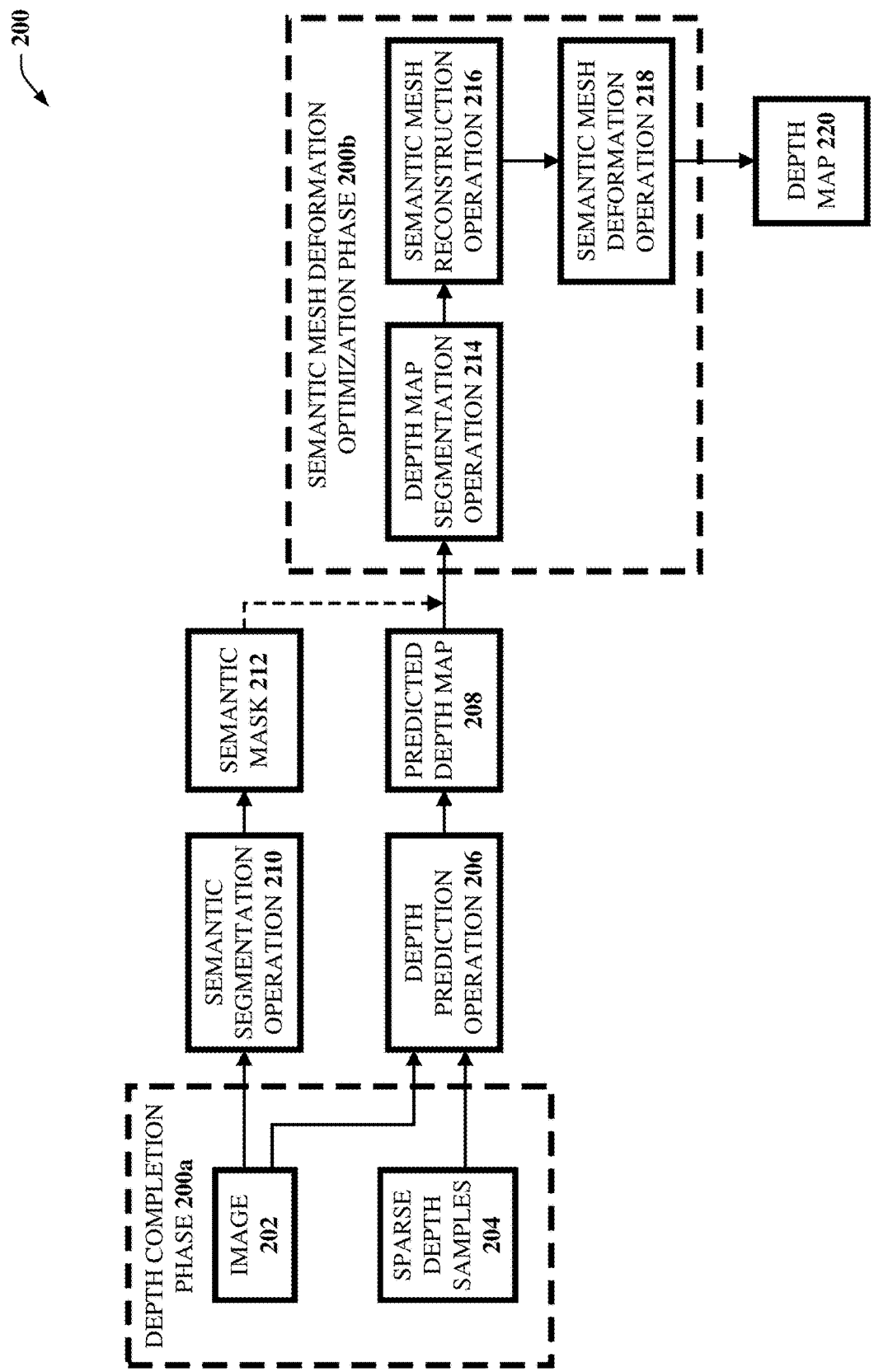

FIG. 2 illustrates a block diagram of an example, non-limiting system 200 that can facilitate sparse depth completion with semantic mesh deformation optimization in an augmented reality environment in accordance with one or more embodiments described herein. Repetitive description of like elements and/or processes employed in respective embodiments is omitted for sake of brevity.

As described above, system 200 can comprise an example overall system architecture that can be implemented by depth map generation system 102 to perform one or more of the above described operations in accordance with one or more embodiments described herein. As illustrated in the example embodiment depicted in FIG. 2, system 200 can comprise a depth completion phase 200a and/or a semantic mesh deformation optimization phase 200b. In this example embodiment, in depth completion phase 200a, depth completion component 108 can predict a first depth map. In this example embodiment, in semantic mesh deformation optimization phase 200b, semantic mesh deformation component 110 can optimize the first depth map (e.g., with respect to image accuracy and/or robustness) using a semantic mesh deformation process.

In the example embodiment depicted in FIG. 2, depth completion component 108 can perform a depth prediction operation 206 to generate a predicted depth map 208 using at least one image 202 (e.g., an RGB image) and/or one or more sparse depth samples 204 as input. For example, as described below in sections 1.0-1.7, depth completion component 108 can use the novel network architecture described below to perform depth prediction operation 206 and generate predicted depth map 208 using image 202 (e.g., an RGB image) and/or sparse depth samples 204 as input. In various embodiments, the novel network architecture described herein can be trained with a semantic edge-weighted loss function as described below in sections 1.0-1.7.

In depth completion phase 200a, depth completion component 108 can perform depth prediction operation 206 to generate (e.g., predict) predicted depth map 208 using image 202 (e.g., an RGB image), sparse depth samples 204, and the novel network architecture described below to capture the overall shapes of one or more objects in image 202. In depth completion phase 200a, depth map generation system 102 (e.g., via depth completion component 108) can perform semantic segmentation operation 210 as described below in sections 1.0-1.7 to generate semantic mask 212. In various embodiments, depth map generation system 102 (e.g., via depth completion component 108 and/or semantic mesh deformation component 110) can combine semantic mask 212 with predicted depth map 208 to facilitate semantic mesh deformation optimization phase 200b as described below in sections 2.0-2.3 to optimize predicted depth map 208 (e.g., with respect to image accuracy and/or robustness) using a semantic mesh deformation process.

In semantic mesh deformation optimization phase 200b, semantic mesh deformation component 110 can optimize predicted depth map 208 using a semantic mesh deformation process. For example, semantic mesh deformation component 110 can perform the semantic mesh deformation optimization process described below in sections 2.0-2.3. The semantic mesh deformation optimization process described below in sections 2.0-2.3 comprises depth map segmentation operation 214, semantic mesh reconstruction operation 216, and semantic mesh deformation operation 218, and thus, details of such operations are provided in those sections. In this example, semantic mesh deformation component 110 can perform the semantic mesh deformation optimization process described below to calibrate the absolute errors in predicted depth map 208 at an object instance level and thereby yield a depth map 220 having enhanced overall accuracy and appearance relative to predicted depth map 208 and/or to a depth map generated by existing technologies.

1.0 Example Problem Formulation

The various embodiments described herein and/or illustrated in the figures are based on an example problem that can be formulated as follows. Given an input RGB image as $I \in \mathbb{R}^{H \times W \times 3}$ and the sparse depth samples as $D_S \in \mathbb{R}^W$, where $D_S$ (p) indicates the depth value when the depth sample at pixel p=(i, j) is available, otherwise depth map generation system 102 can set it to a default value of zero. Depth map generation system 102 can denote the combination of an RGB image I and sparse depth samples $D_S$ as RGB-SD. In accordance with one or more embodiments described herein, depth map generation system 102 can learn a mapping $\mathbb{M}$ which produces a depth map $D' \in \mathbb{R}^{H \times W}$ of full resolution from the RGB-SD data: $\mathbb{M}(I, D_S) \to D'$.

1.1 Depth Completion from RGB-SD

In accordance with one or more embodiments described herein, depth completion component 108 can predict a first depth map (e.g., a predicted and/or completed depth map) using, for example, a convolutional neural network (CNN) based encoder-decoder neural network, taking the RGB-SD as input, by extending the RGB image with an additional depth channel. It should be appreciated that depth completion component 108 can adopt the novel network architecture described below to improve performance and can use the novel semantic edge-weighted loss function described below to further push the limits of the state-of-the-art from neural networks.

1.2 Neural Network Architecture

As described above, depth completion component 108 can use a CNN-based encoder-decoder architecture to perform depth map prediction, as it achieves the state-of-the-art result. In some embodiments, depth completion component 108 can use, for example, ResNet as the base model for encoder layers. However, in accordance with one or more embodiments described herein, depth completion component 108 can use, for example, EfficientNet as the base model for encoder layers, as it has proven to have relatively better performance in many existing tasks compared to ResNet (e.g., EfficientNet improves the top-1 accuracy by 6.7% on an ImageNet image classification task compared to ResNet based approaches). The key improvement of EfficientNet is that it adopts a compound scaling method, which comprises scaling all dimensions (e.g., width, depth, and/or resolution) with a constant ratio, which provides a better performance. In accordance with one or more embodiments described herein, depth completion component 108 can tailor the model with input data of different modalities, sizes, and/or dimensions to apply to the example problem formulated above. For fair comparison, depth completion component 108 can use the same RGB resolution as used in existing technologies, plus an additional sparse depth channel as input. An example overall structure of a network that can be implemented by depth map generation system 102 and/or depth completion component 108 to generate a first depth map (e.g., a predicted and/or completed depth map) in accordance with one or more embodiments described herein is described below and illustrated in FIG. 3.

Figure 3:
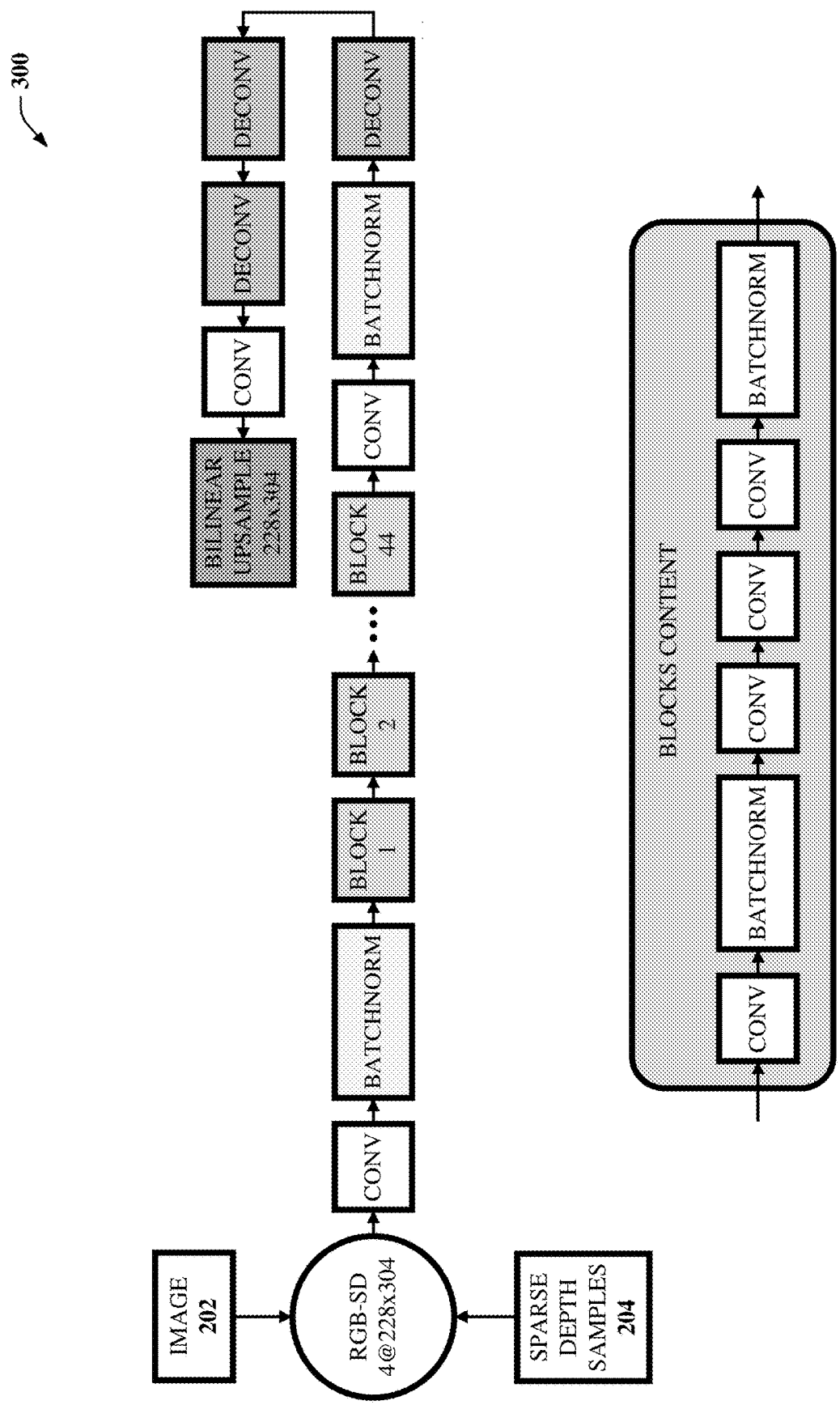
FIG. 3 illustrates a block diagram of an example, non-limiting model that can facilitate sparse depth completion with semantic mesh deformation optimization in an augmented reality environment in accordance with one or more embodiments described herein.

FIG. 3 illustrates a block diagram of an example, non-limiting model 300 that can facilitate sparse depth completion with semantic mesh deformation optimization in an augmented reality environment in accordance with one or more embodiments described herein. Repetitive description of like elements and/or processes employed in respective embodiments is omitted for sake of brevity.

Model 300 illustrated in the example embodiment depicted in FIG. 3 can comprise an example overal structure of a network that can be implemented by depth map generation system 102 and/or depth completion component 108 to generate a predicted depth map (also referred to as a "completed depth map"). In the example embodiment depicted in FIG. 3, model 300 can comprise encoder layers. In this embodiment, such encoder layers can comprise a convolutional layer (denoted as "CONV" in FIG. 3), a batch normalization layer (denoted as "BATCHNORM" in FIG. 3), and/or a series of EfficientNet building blocks (denoted as "BLOCK 1," "BLOCK 2," and "BLOCK 44" in FIG. 3). As illustrated in the example embodiment depicted in FIG.

3, each of such EfficientNet building blocks can comprise a convolution layer (denoted as "CONV" in FIG. 3), a batch normalization layer (denoted as "BATCHNORM" in FIG. 3), three convolution layers (denoted as "CONV" in FIG. 3), and/or another batch normalization layer (denoted as "BATCHNORM" in FIG. 3).

In the example embodiment depicted in FIG. 3, the amount and/or sizes of blocks can vary from different versions of EfficientNet (e.g., which can be denote as EN-B0 to EN-B7, for instance). In one embodiment, based on experimental results obtained from implementing depth map generation system 102 using model 300, the best relative performance was obtained from a version of EfficientNet with the EN-B6, which comprises 44 blocks (e.g., as illustrated in FIG. 3). In the example embodiment depicted in FIG. 3, the last average pooling layer and/or linear transformation layer of the original EN-B6 can be removed for feature extraction as encoding layers. In the example embodiment depicted in FIG. 3, the decoding layers can comprise multiple upsampling layers (denoted as "DECONV" in FIG. 3) that can be followed by a bilinear upsampling layer (denoted as "BILINEAR UNSAMPLE 228×304" in FIG. 3). In the example embodiment depicted in FIG. 3, depth map generation system 102 and/or depth completion component 108 can use deconvolution with a 3×3 kernel size as the upsampling layers, which slightly outperforms the UpProj module used in existing technologies.

1.3 Loss Function

Common choices of loss function for such regression problems described herein can be based on absolute error ($\mathcal{L}_1$) or mean squared error ($\mathcal{L}_2$). In some embodiments, depth map generation system 102 and/or depth completion component 108 can choose $\mathcal{L}_2$ as a default basic loss function, where $\mathcal{L}_2$ can be defined as:

$$\mathcal{L}_2 = \frac{1}{N}\sum\nolimits_{p\in P}[D(p)-D'(p)]^2 \quad (1A)$$

where p=(i, j) denotes the index of the pixel, P denotes the index set of all pixels, N denotes the number of pixels in the set P, and D(p) and D'(p) denote the values of the pixels in the ground truth and predicted depth maps, respectively.

However, $\mathcal{L}_2$ is relatively more sensitive to outliers in the training process compared to $\mathcal{L}_1$ as it penalizes more heavily on large errors, which yields over-smoothed boundaries of objects in an image instead of sharp transitions. Therefore, in accordance with one or more embodiments described herein, depth map generation system 102 and/or depth completion component 108 can choose $\mathcal{L}_1$ as a default basic loss function for its relative simplicity and performance (e.g., compared to $\mathcal{L}_2$). The ground truth depth map can be denoted as $D \in \mathbb{R}^{H\times W}$ and the predicted depth map can be denoted as $D' \in \mathbb{R}^{H\times W}$, then the basic $\mathcal{L}_1$ can be defined as:

$$\mathcal{L}_1 = \frac{1}{N}\sum\nolimits_{p\in P}|D(p)-D'(p)| \quad (1B)$$

where p=(i, j) denotes the index of the pixel, P denotes the index set of all pixels, N denotes the number of pixels in the set P, and D(p) and D'(p) denote the values of the pixels in the ground truth and predicted depth maps, respectively.

1.4 Semantic Edge-Weighted Loss Function

With the basic $\mathcal{L}_1$ loss function, model 300 can achieve slightly better results compared to existing technologies. However, major errors exist on the pixels of object boundaries. For example, the largest errors are mostly located at edges of objects in an image, where such edges match extracted edges from segmentation masks. Based on this observation, depth map generation system 102 (e.g., via depth completion component 108 and/or semantic mesh deformation component 110) can employ a semantic edge-weighted loss function to further explore the opportunity for optimization. This requires two main steps: semantic edge extraction and edge-weighted loss design.

1.5 Semantic Edge Extraction

First, depth map generation system 102 (e.g., via depth completion component 108 and/or semantic mesh deformation component 110) can extract semantic segmentation masks from an image (e.g., an RGB image) to isolate the individual object instances. In some embodiments, depth map generation system 102 can use an existing semantic segmentation network with pre-trained weights to generate the mask images. Next, depth map generation system 102 (e.g., via depth completion component 108 and/or semantic mesh deformation component 110) can apply Canny edge detection on the mask images to extract the edges of the object instances. Note that this is different from directly applying Canny edge detection on the input image (e.g., an input RGB image), which captures all the visual edges, rather than the semantic edges that only contain the object boundaries. In various embodiments, depth map generation system 102, depth completion component 108 and/or semantic mesh deformation component 110 can ignore visual edges in texture-rich objects since they belong to the same object, which usually have depth continuity, while different objects usually have depth variations.

1.6 Edge-Weighted Loss Design

In accordance with one or more embodiments described herein, depth map generation system 102 can assume the resulting edge image from Canny edge detection is represented as $E \in \mathbb{R}^{H\times W}$, where E (p)=1 means the pixel belongs to the edge and E(p)=0 means the pixel is within an object. In some embodiments, since pixels on the edges produce larger errors, depth map generation system 102 (e.g., via depth completion component 108 and/or semantic mesh deformation component 110) can apply different weights on such pixels when calculating the $\mathcal{L}_1$ loss. In these embodiments, depth map generation system 102 can multiply the loss at such pixels with a constant value of α, which determines the weight. Thus, the modified loss function can be defined as follows:

$$\mathcal{L} = \frac{1}{N}\sum\nolimits_{p\in P}(1-E(p))\cdot|D(p)-D'(p)| + \alpha\cdot E(p)\cdot|D(p)-D'(p)| \quad (2)$$

In some embodiments, putting more weights (α>1) on such edge pixels can help improve the performance In some embodiments, depth map generation system 102 (e.g., via depth completion component 108 and/or semantic mesh deformation component 110) can use empirical values for α=100 in the settings. In these embodiments, pixels with relatively large errors can cover a wider area than the sharp edges. In some embodiments, depth map generation system 102 (e.g., via depth completion component 108 and/or semantic mesh deformation component 110) can assign weights on the pixels around the edges to capture more pixels with large errors.

Pixels with large errors can cover a wider area than the sharp edges. Therefore, in some embodiments, depth map generation system 102 (e.g., via depth completion component 108 and/or semantic mesh deformation component 110) can leverage more pixels around the extracted edges to optimize the loss function. Pixels closer to the edges can have larger errors, while such errors are decaying as they are farther away from the edges. Based on this observation, depth map generation system 102 (e.g., via depth completion component 108 and/or semantic mesh deformation component 110) can assign different weights to such pixels accordingly, following a certain decaying distribution. In some embodiments, instead of calculating the weights for each pixel at running time during training, depth map generation system 102 (e.g., via depth completion component 108 and/or semantic mesh deformation component 110) can pre-process the detected edge image E by applying a Kernel filter to dilute the edges, which saves repeated computations.

1.7 Edge Dilution

In accordance with one or more embodiments described herein, depth map generation system 102 (e.g., via depth completion component 108 and/or semantic mesh deformation component 110) can use an exponential density function to represent the weight distribution:

$$W(p) = \alpha \cdot e^{-\beta \cdot d(p)}, \text{ if } d(p) < d_{max} \quad (3)$$

where $W(p)$ denotes the weight assigned to pixel p, $\alpha$ denotes a parameter representing the largest weight for pixels on the edges, $\beta$ denotes the rate parameter to control decreasing rate of the distribution, $d(p) = \min(|p-q|)$, where $E(q)=1$ denotes the closest distance from $D(p)$ to the edge, and $d_{max}$ denotes the threshold to the expanded edge. Then the improved semantic edge-weighted loss function can be defined as:

$$\mathcal{L}_1 = \begin{cases} \frac{1}{N}\sum_{p \in P} |D(p) - D'(p)| & \text{if } d(p) > d_{max} \\ \frac{1}{N}\sum_{p \in P} \alpha \cdot e^{-\beta \cdot d(p)} |D(p) - D'(p)| & \text{if } d(p) \le d_{max} \end{cases} \quad (4)$$

In some embodiments, depth map generation system 102 (e.g., via depth completion component 108 and/or semantic mesh deformation component 110) can put more weights ($\alpha > 1$) on such edge pixels to improve the performance In an example embodiment, depth map generation system 102 can use empirical values for $\alpha=100$, $\beta=0.5$ and $d_{max}=5$ in the settings.

2.0 Semantic Mesh Deformation Optimization

Figure 4:
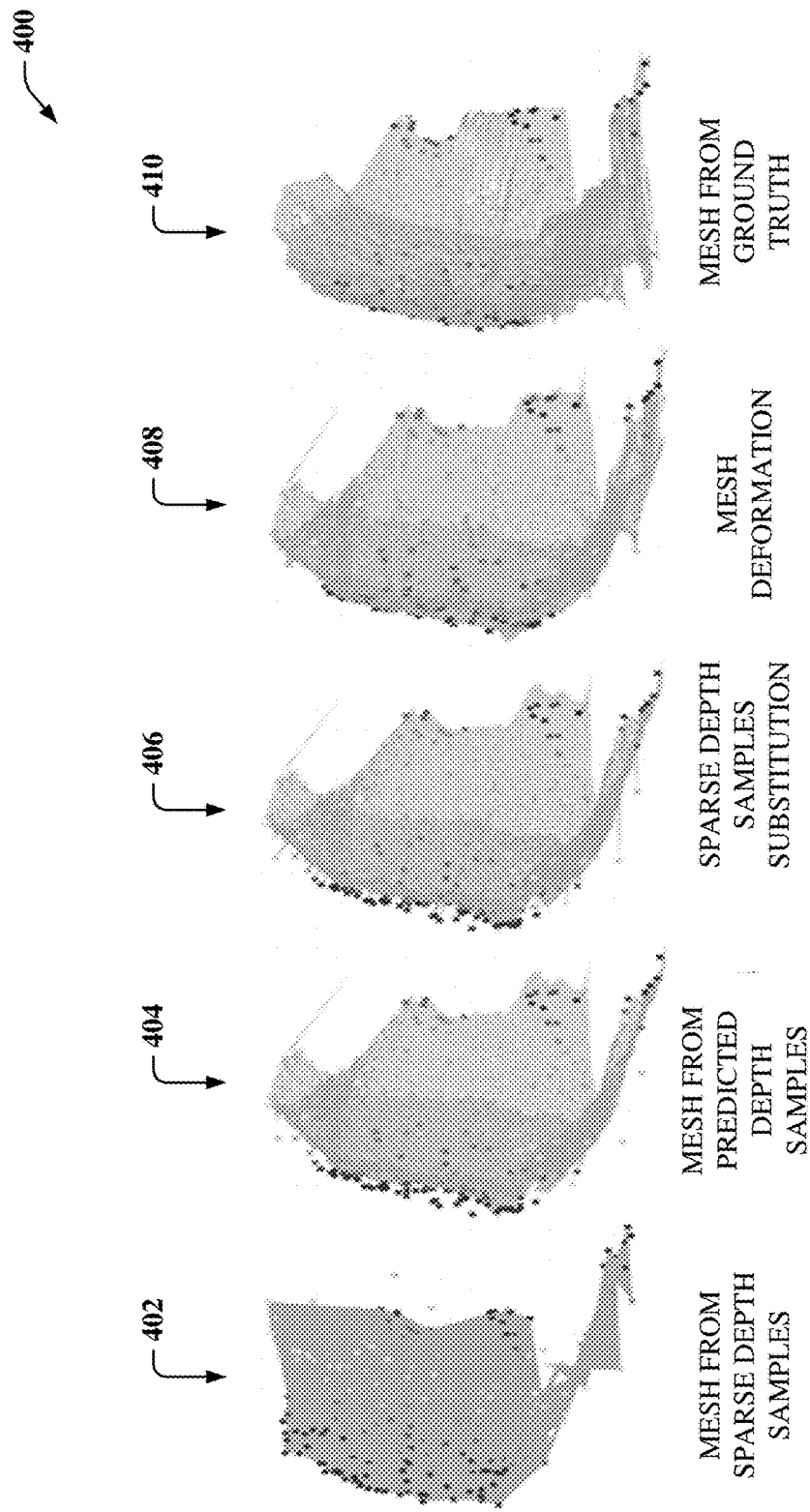
FIG. 4 illustrates an example, non-limiting diagram of mesh reconstruction results that can be obtained in accordance with one or more embodiments described herein.

Based on obtaining a complete full depth map from trained model 300, semantic mesh deformation component 110 can project the input sparse depth samples and a mesh reconstructed from the predicted depth map into a multi-dimensional (e.g., 3D) coordinate space to visualize it, for instance, as illustrated by image 404 depicted in diagram 400 of FIG. 4.

FIG. 4 illustrates an example, non-limiting diagram 400 of mesh reconstruction results that can be obtained in accordance with one or more embodiments described herein. Repetitive description of like elements and/or processes employed in respective embodiments is omitted for sake of brevity.

Diagram 400 illustrates mesh reconstruction results that can be obtained by implementing depth map generation system 102 in accordance with one or more embodiments described herein. For example, diagram 400 illustraes a mesh constructed from sparse depth samples and/or predicted depth samples, and optimized by sparse samples substitution and mesh deformation in accordance with one or more embodiments described herein.

As illustrated in FIG. 4, diagram 400 comprises images 402, 404, 406, 408, 410. Image 402, 404, 406, 408, and/or 410 can be obtained by implementing depth map generation system 102 in accordance with one or more embodiments described herein. Image 402 depicts an image of a mesh that can be obtained using sparse depth samples. Image 404 depicts an image of a mesh that can be obtained using predicted depth samples. Image 406 depicts an image of a mesh that can be obtained using sparse depth samples substitution. Image 408 depicts an image of a mesh that can be obtained using mesh deformation. Image 410 depicts an image of a mesh that can be obtained using ground truth data.

As illustrated by image 404 in FIG. 4, a resulting depth map (e.g., predicted depth map 208) can capture the overall multi-dimensional (e.g., 3D) shapes of a scene in an image very well because it has learned from rich images (e.g., rich RGB images) and sparse depth samples. However, it shows obvious errors at most of the known sparse depth samples, as illustrated in image 404. Ideally, these known depth samples should reside on the mesh surface, as illustrated by image 410 in FIG. 4, rather than floating around the mesh. Simply calibrating the output depth map by substituting the predicted depth samples with the known samples can improve the overall accuracy. This means that the results from neural networks are not optimal, thus, depth map generation system 102 can implement additional steps here to improve accuracy as described below.

As the sparse depth samples only take a very small fraction of all pixels (e.g., usually <3% in most settings), calibrating such pixels only brings negligible improvement to the overall accuracy. Instead, depth map generation system 102 and/or semantic mesh deformation component 110 can employ a semantic mesh deformation process to calibrate at least one pixel in a predicted depth map (e.g., a depth map that can be generated by depth completion component 108 as described above). For example, depth map generation system 102 and/or semantic mesh deformation component 110 can employ a semantic mesh deformation process to optimize all the depth pixels in a predicted depth map (e.g., a depth map that can be generated by depth completion component 108 as described above), where such a process can comprise the following steps: semantic mesh reconstruction, semantic mesh deformation, and depth map generation.

2.1 Semantic Mesh Reconstruction

In accordance with one or more embodiments described herein, semantic mesh deformation component 110 can apply a semantic mesh reconstruction process to reconstruct a mesh for each object instance in an image (e.g., an RGB image) to calibrate such meshes independently rather than optimizing a single mesh reconstructed from the full depth map globally. By calibrating the meshes independently, semantic mesh deformation component 110 can provide sharp transitions between adjacent objects at different depth distances in an image (e.g., an RGB image). To perform semantic mesh reconstruction, semantic mesh deformation component 110 can implement the following steps described below:

Step 1: Semantic Depth Map Segmentation

Semantic mesh deformation component 110 can segment the predicted depth map $\mathcal{D}'$ into a list of semantic depth maps $\mathcal{D}_d = \{D'_1, D'_2, \ldots, D'_N\}$ according to the semantic segmentation masks obtained in semantic edge-weighted loss computation described above, where each $D'_i$ can comprise the portion of the depth map of one object and N denotes the total number of segmented objects. Semantic mesh deformation component 110 can also divide the sparse depth samples $D_S$ into groups based on the segmentation mask and associate them to each semantic depth map $D'_i$. Semantic mesh deformation component 110 can represent such grouped sparse samples as $\mathcal{S} = \{S_1, S_2, \ldots, S_N\}$, where each $S_i$ comprises the sparse samples falling into the corresponding mask. Semantic mesh deformation component 110 can remove those grouped depth samples $D'_i$ and grouped sparse samples $S_i$ from $D'_d$ and S if $S_i$ contains no sparse depth samples due to none of them falling into the associated object mask.

Step 2: Depth to 3D Projection

Semantic mesh deformation component 110 can then project such segmented depth maps to a multi-dimensional (e.g., 3D) space. Given the camera intrinsic parameters of an augmented reality environment, semantic mesh deformation component 110 can calculate, for instance, the 3D coordinates of each depth sample of depth d following the projection rules. Thus, semantic mesh deformation component 110 can convert the semantic depth maps $\mathcal{D}_i = \{D'_1, D'_2, \ldots, D'_N\}$ to a list of point clouds in 3D coordinates $\mathcal{P} = \{P_1, P_2, \ldots, P_N\}$, where each point cloud $P_i$ consists of the predicted depth samples of an object instance.

Step 3: Semantic Mesh Reconstruction

After the point cloud list $\mathcal{P}$ is obtained, semantic mesh deformation component 110 can reconstruct a mesh for each point cloud $P_i$ to further optimize it. To facilitate such mesh reconstruction, semantic mesh deformation component 110 can, for instance, create a mesh by assigning edge connections between nearby vertices. For example, semantic mesh deformation component 110 can leverage Delaunay triangulation algorithms to create triangular connections for mesh generation. Diagram 500 illustrated in FIG. 5 depicts two semantic meshes that can be created by semantic mesh deformation component 110 by connecting the vertices within each point cloud group.

Figure 5:
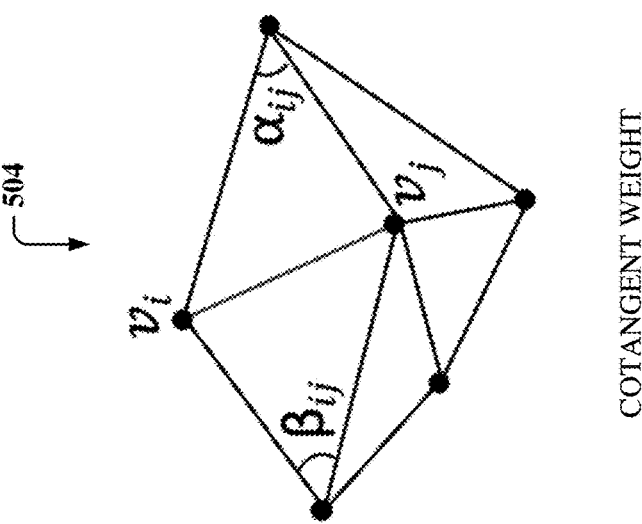
FIG. 5 illustrates an example, non-limiting diagram of two semantic meshes that can be created in accordance with one or more embodiments described herein.
Figure 5:
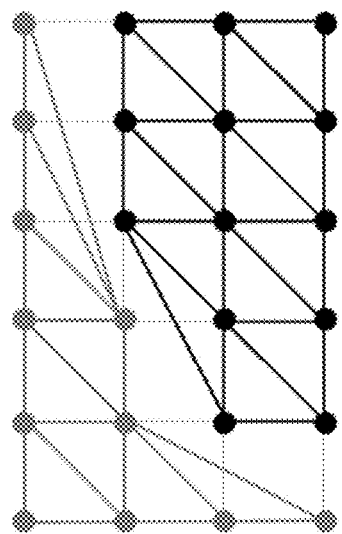

FIG. 5 illustrates an example, non-limiting diagram 500 of two semantic meshes that can be created in accordance with one or more embodiments described herein. Repetitive description of like elements and/or processes employed in respective embodiments is omitted for sake of brevity.

Diagram 500 illustrates two semantic meshes that can be created by semantic mesh deformation component 110 in accordance with one or more embodiments described herein. For example, diagram 500 depicts a semantic mesh 502 and a cotangent weight illustration 504 that can each be created by semantic mesh deformation component 110 as described above by connecting vertices within a point cloud group.

Based on such mesh reconstruction, semantic mesh deformation component 110 can denote the reconstructed meshes (e.g., semantic mesh 502 and/or cotangent weight illustration 504) for object instances as $\mathcal{M} = \{M_1, M_2, \ldots, M_N\}$. Semantic mesh deformation component 110 can then optimize the vertex positions of each $M_i$ using a semantic mesh deformation process and leveraging the corresponding sparse depth samples $S_i$.

2.2 Semantic Mesh Deformation

The reconstructed object instance meshes $\mathcal{M} = \{M_1, M_2, \ldots, M_N\}$ captures the overall shape of each object viewed from a camera and each mesh $M_i$ has an associated group of sparse samples $S_i$, which are referred to as "anchors." Semantic mesh deformation component 110 can perform such mesh deformation to apply transformation and adjustments on the mesh $M_i$ to make the corresponding vertices to be as close as possible to the anchors while minimizing the overall shape changes of the mesh. Semantic mesh deformation component 110 can choose to apply an "as rigid as possible" mesh deformation approach to retain the overall shapes predicted from the neural network, while calibrating the mesh to the correct position.

For each mesh $M_i$ and the corresponding sparse depth sample $S_i$, semantic mesh deformation component 110 can deform the mesh to such anchor points by minimizing the following energy function:

$$E = \Sigma_i \Sigma_{j \in N(i)} w_{ij} \| (p'_i - p'_j) - R_i (p_i - p_j) \|^2 \quad (5)$$

where $R_i$ denotes the rotation matrices to optimize, and $p_i$ and $p'_i$ denote the vertex positions before and after the optimizations, that is, for instance, $p'_i \in S_i$ and $p_i$ denotes the corresponding vertex in $M_i$. $\mathcal{N}(i)$ denotes the set of neighbors of vertex i. The weights $w_{ij} = \frac{1}{2}(\cot \alpha_{ij} + \cot \beta_{ij})$ are cotangent weights as shown by cotangent weight illustration 504 depicted in FIG. 5. Since the cotangent weights are representations based on angles, they preserve angles and shapes better during the deformation. Semantic mesh deformation component 110 can then optimize this energy function in an iterative way to get the rotation matrices $R_i$, based on which, semantic mesh deformation component 110 can deform the semantic mesh $M_i$ by applying the rotation matrices to the associated vertices.

An example of the deformed mesh (e.g., image 408) is shown in FIG. 4. Image 402 depicted in FIG. 4 shows a mesh reconstructed from the available sparse depth samples (e.g., the above referenced anchors) only, which is very coarse-grained. The anchors are shown in FIG. 4 as varying shades of gray colored dots. Image 404 depicted in FIG. 4 shows the reconstructed mesh based on the predicted depth map. It captures much more fine-grained shapes, however, it also shows obvious errors when matching to the known anchors. A way to optimize it is by substituting corresponding vertices in the mesh with the known anchors, for example, as shown in image 406 depicted in FIG. 4. Image 408 illustrated in FIG. 4 shows the mesh after deformation to these anchors and image 410 illustrated in FIG. 4 depicts the mesh reconstructed from the ground truth depth map. It should be appreciated that mesh deformation that can be performed by depth map generation system 102 in accordance with one or more embodiments described herein can provide overall improvements to all the pixels, yielding the closest result (e.g., image 408) to the ground truth (e.g., image 410).

2.3 Depth Map Regeneration

To generate the final depth map from the deformed meshes, semantic mesh deformation component 110 can project the vertices of each mesh from a first multi-dimensional space (e.g., 3D) to a second multi-dimensional space (e.g., 2D) from a camera view feature and can further calculate the distances to the camera. For those meshes without supporting anchors, semantic mesh deformation component 110 can keep them unchanged and assign the original depth values for the corresponding pixels.

Figure 6:
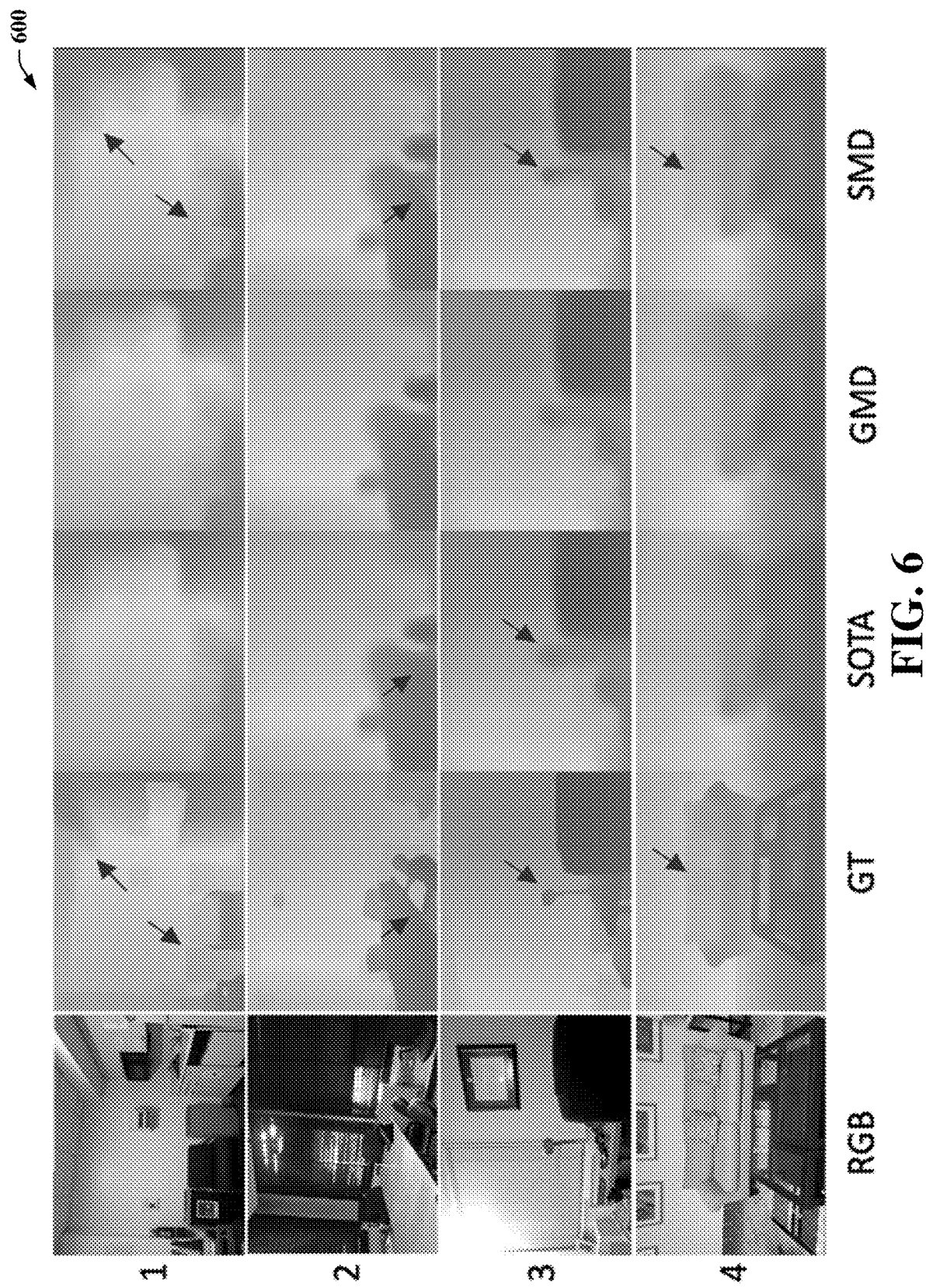
FIG. 6 illustrates an example, non-limiting diagram of example depth map results that can be obtained in accordance with one or more embodiments described herein.

FIG. 6 illustrates an example, non-limiting diagram 600 of example depth map results that can be obtained in accordance with one or more embodiments described herein. Repetitive description of like elements and/or processes employed in respective embodiments is omitted for sake of brevity.

Diagram 600 illustrates example depth map results obtained by implementing depth map generation system 102 in accordance with one or more embodiments described herein, as well as results obtained by implementing existing technologies (also referred to as "state-of-the-art" or "SOTA"). As illustrated in FIG. 6, diagram 600 comprises RGB images 1, 2, 3, and 4 (denoted as "RGB" in FIG. 6) that have been used to implement depth map generation system 102 and existing technologies.

The column denoted as "GT" in diagram 600 illustrates example ground truth depth map results that respectively correspond to RGB images 1, 2, 3, and 4. The column denoted "SOTA" illustrates example state-of-the-art (SOTA) depth map results obtained by implementing state-of-the-art, existing technologies using corresponding RGB images 1, 2, 3, and 4. The column denoted "GMD" illustrates example global mesh deformation (GMD) depth map results obtained by implementing a GMD optimization process using corresponding RGB images 1, 2, 3, and 4 (e.g., reconstructing a single mesh from a predicted depth map and deforming it to all known sparse points). The column denoted "SMD" illustrates example semantic mesh deformation (SMD) depth map results obtained by implementing depth map generation system 102 using corresponding RGB images 1, 2, 3, and 4 in accordance with one or more embodiments described herein.

As indicated by the arrows depicted in diagram 600, the example SMD depth map results, which can be obtained by implementing depth map generation system 102 in accordance with one or more embodiments described herein, have relatively sharper and cleaner boundary transitions between adjacent objects in RGB images 1, 2, 3, and 4 when compared to the other example depth map results in diagram 600. It should be appreciated that such sharper transitions in the example SMD depth map results increase the visual appearance of the RGB objects appearing in the example SMD depth map results, as well as the image accuracy and/or robustness of the example SMD depth map results. With reference to RGB image 1, the chairs at the bottom left corner and the ceiling at the top right corner are noticeably improved in the example SMD depth map result, as indicated by the arrows. With reference to the example SMD depth map results, the shapes of the table in RGB image 2, the lamp in RGB image 3, and the sofa in RGB image 4 are all relatively closer to the corresponding shapes in the example GT depth map results compared to the example SOTA and GMD depth map results, which makes them much relatively easier to recognize. In contrast, such details are blurred out in example SOTA and GMD depth map results, which makes them relatively harder to recognize.

Figure 7:
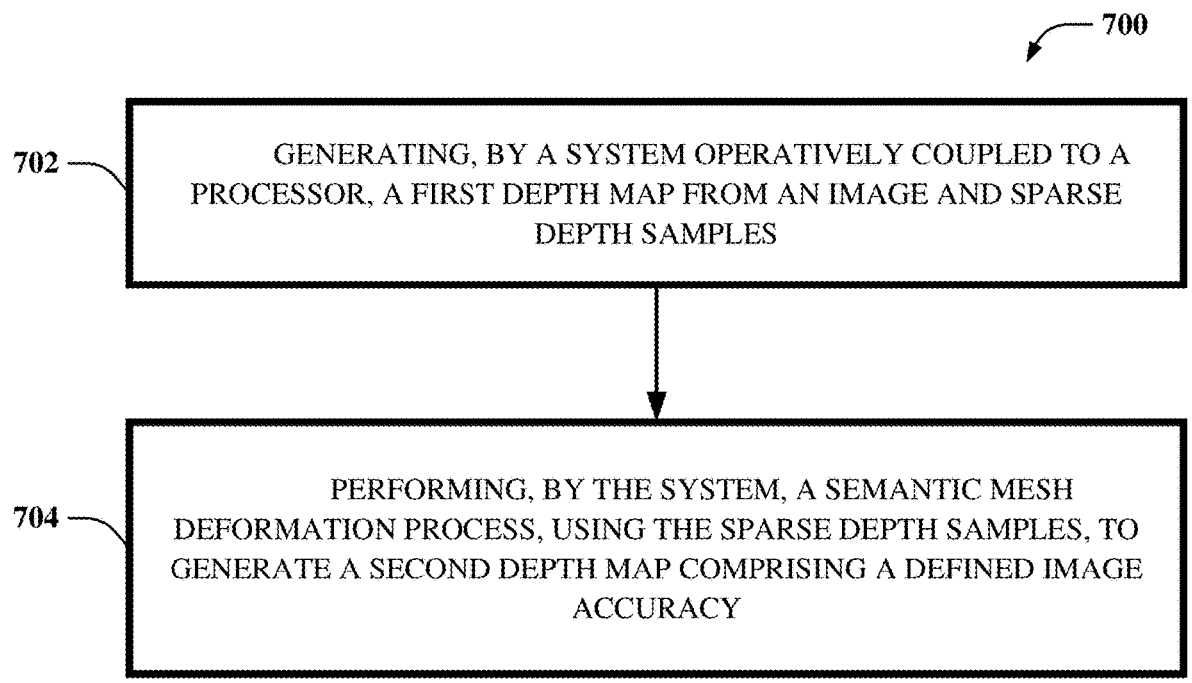
FIG. 7 illustrates a flow diagram of an example, non-limiting computer-implemented method that can facilitate sparse depth completion with semantic mesh deformation optimization in an augmented reality environment in accordance with one or more embodiments described herein.

FIG. 7 illustrates a flow diagram of an example, non-limiting computer-implemented method 700 that can facilitate sparse depth completion with semantic mesh deformation optimization in an augmented reality environment in accordance with one or more embodiments described herein. Repetitive description of like elements and/or processes employed in respective embodiments is omitted for sake of brevity.

At 702, computer-implemented method 700 can comprise generating, by a system (e.g., depth map generation system 102 and/or depth completion component 108) operatively coupled to a processor (e.g., processor 106), a first depth map (e.g., predicted depth map 208) from an image (e.g., image 202) and sparse depth samples (e.g., sparse depth samples 204).

At 704, computer-implemented method 700 can comprise performing, by the system (e.g., depth map generation system 102 and/or semantic mesh deformation component 110), a semantic mesh deformation process (e.g., as described above in sections 2.0-2.3), using the sparse depth samples, to generate a second depth map (e.g., depth map 220) comprising a defined image accuracy (e.g., a relatively improved image accuracy compared to depth maps generated by existing technologies, as demonstrated by the example SMD depth maps illustrated in FIG. 6).

Depth map generation system 102 can be associated with various technologies. For example, depth map generation system 102 can be associated with augmented reality technologies, machine learning (ML) and/or artificial intelligence (AI) model technologies, cloud computing technologies, Internet-of-Things (IoT) technologies, and/or other technologies.

Depth map generation system 102 can provide technical improvements to systems, devices, components, operational steps, and/or processing steps associated with the various technologies identified above. For example, depth map generation system 102 can facilitate sparse depth completion with semantic mesh deformation optimization in an augmented reality environment by: generating a first depth map from an image and sparse depth samples; and/or performing a semantic mesh deformation process, using the sparse depth samples, to calibrate at least one pixel in the first depth map and to generate a second depth map comprising a defined image accuracy. An advantage of depth map generation system 102 is that it can generate depth maps having better local and global accuracy compared to those generated by existing technologies, thereby facilitating at least one of improved accuracy, improved efficiency, or reduced processing workload associated with generating a depth map.

Another advantage of depth map generation system 102 is that it can facilitate relatively more accurate and robust 3D model representations compared to RGB-only approaches. Another advantage of depth map generation system 102 is that it can facilitate relatively clearer object boundaries in depth maps, thus more accurate and visually pleasant depth maps. Another advantage of depth map generation system 102 is that it can be integrated with existing augmented reality software development kits (SDKs) seamlessly to enhance the 3D understanding.

Depth map generation system 102 can provide technical improvements to a processing unit associated with depth map generation system 102. For example, as depth map generation system 102 can generate depth maps having better local and global accuracy compared to those generated by existing technologies, it can thereby facilitate reduced processing workload and/or improved efficiency of a processor (e.g., processor 106) used to generate a depth map, as fewer processing iterations are involved with generating a depth map having a defined image accuracy (e.g., a desired image accuracy) using depth map generation system 102 compared to existing technologies.

A practical application of depth map generation system 102 is that it can be implemented in an augmented reality (AR) environment to enable new features in such an environment. For example, a practical application of depth map generation system 102 is that it can be implemented in an AR environment to enable: depth estimation and/or 3D model reconstruction; occlusion detection for more immersive experience; more accurate annotation dropping in remote assist; and/or more reliable 3D object detection and/or tracking.

It should be appreciated that depth map generation system 102 provides a new approach driven by relatively new depth map completion technologies in an AR environment. For example, depth map generation system 102 provides a new approach to predict (e.g., generate) a depth map using a neural network (e.g., model 300), a single RGB image, and detected sparse feature points in an AR environment.

Depth map generation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Depth map generation system 102 and/or components thereof, can be employed to solve new problems that arise through advancements in technologies mentioned above, employment of quantum computing systems, cloud computing systems, computer architecture, and/or another technology.

It is to be appreciated that depth map generation system 102 can utilize various combinations of electrical components, mechanical components, and circuitry that cannot be replicated in the mind of a human or performed by a human, as the various operations that can be executed by depth map generation system 102 and/or components thereof as described herein are operations that are greater than the capability of a human mind. For instance, the amount of data processed, the speed of processing such data, or the types of data processed by depth map generation system 102 over a certain period of time can be greater, faster, or different than the amount, speed, or data type that can be processed by a human mind over the same period of time.

According to several embodiments, depth map generation system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that depth map generation system 102 can include information that is impossible to obtain manually by an entity, such as a human user. For example, the type, amount, and/or variety of information included in depth map generation system 102, depth completion component 108, and/or semantic mesh deformation component 110 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
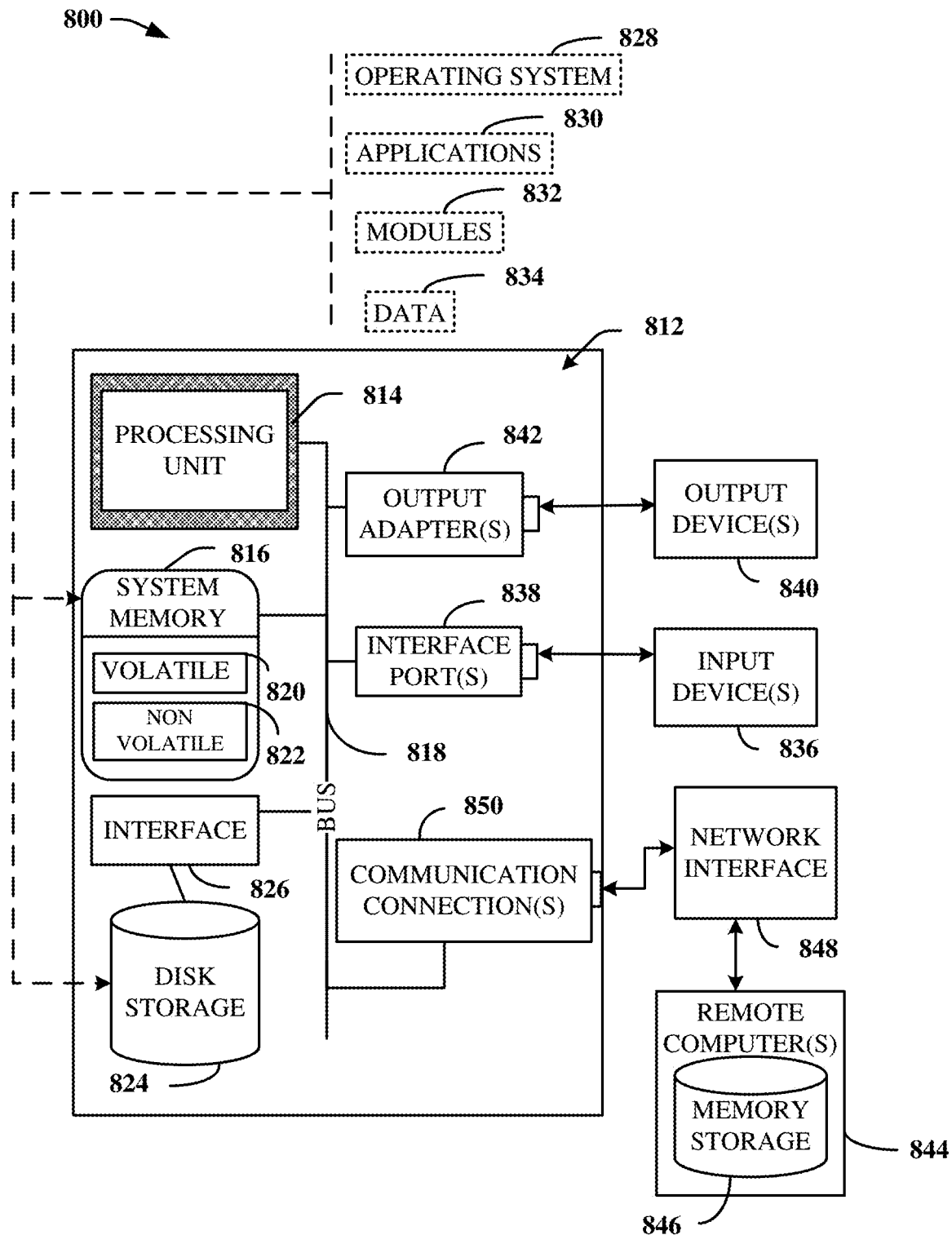
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing one or more embodiments described herein can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that one or more embodiments described herein can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

In some embodiments, depth map generation system 102 can be associated with a cloud computing environment. For example, depth map generation system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Depth map generation system 102 and/or components thereof (e.g., depth completion component 108, semantic mesh deformation component 110, and/or another component) can employ one or more computing resources of cloud computing environment 950 described below with reference to FIG. 9 and/or one or more functional abstraction layers (e.g., quantum software) described below with reference to FIG. 10 to execute one or more operations in accordance with one or more embodiments described herein. For example, cloud computing environment 950 and/or such one or more functional abstraction layers can comprise one or more classical computing devices (e.g., classical computer, classical processor, virtual machine, server, and/or another classical computing device), quantum hardware, and/or quantum software (e.g., quantum computing device, quantum computer, quantum processor, quantum circuit simulation software, superconducting circuit, and/or other quantum hardware and/or quantum software) that can be employed by depth map generation system 102 and/or components thereof to execute one or more operations in accordance with one or more embodiments described herein. For instance, depth map generation system 102 and/or components thereof can employ such one or more classical and/or quantum computing resources to execute one or more classical and/or quantum: mathematical function, calculation, and/or equation; computing and/or processing script; algorithm; model (e.g., AI model, ML model, and/or another type of model); and/or another operation in accordance with one or more embodiments described herein.

It is to be understood that although a detailed description on cloud computing is provided herein, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
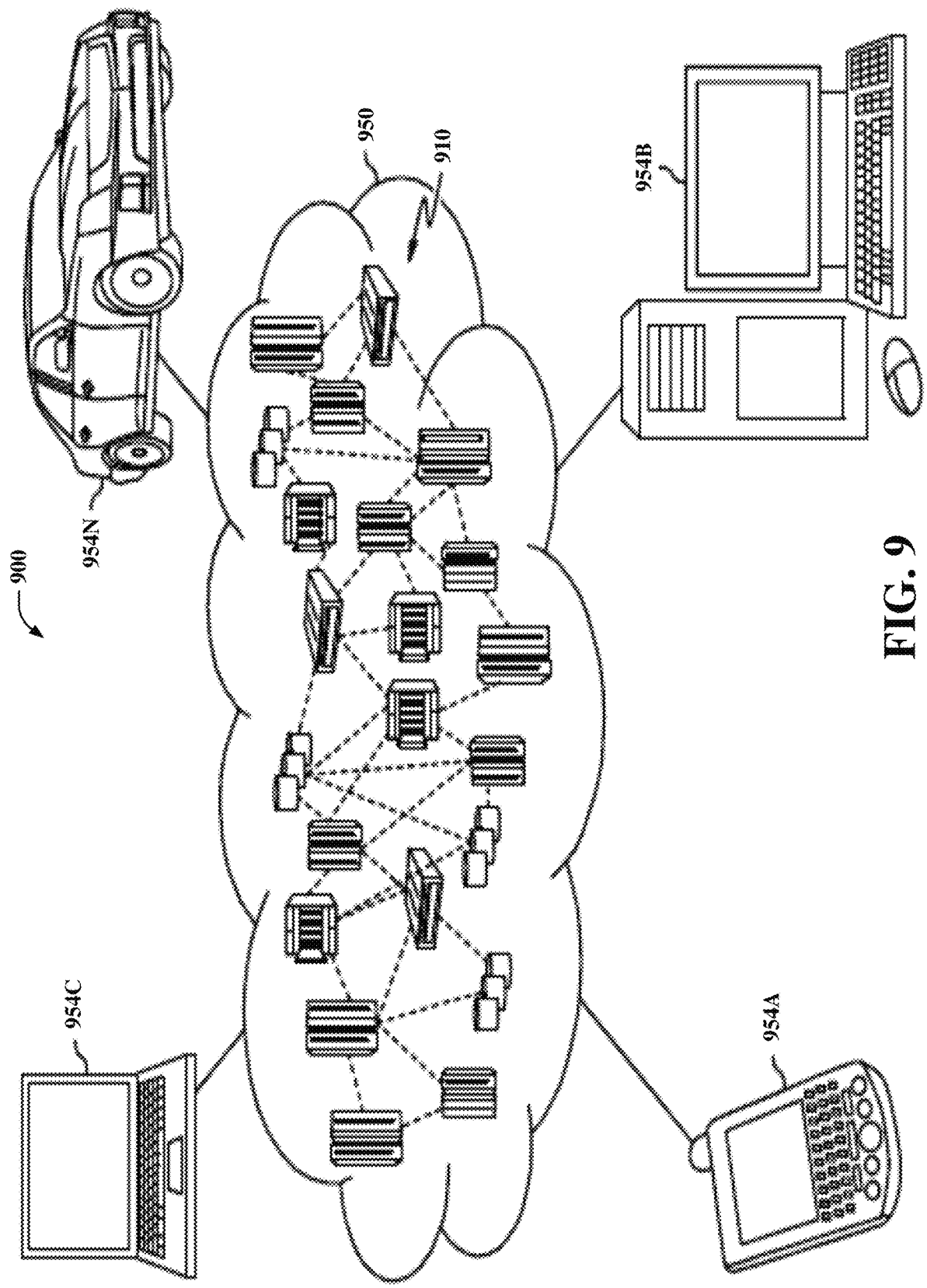
FIG. 9 illustrates a block diagram of an example, non-limiting cloud computing environment in accordance with one or more embodiments described herein.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, and/or another quantum platform) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
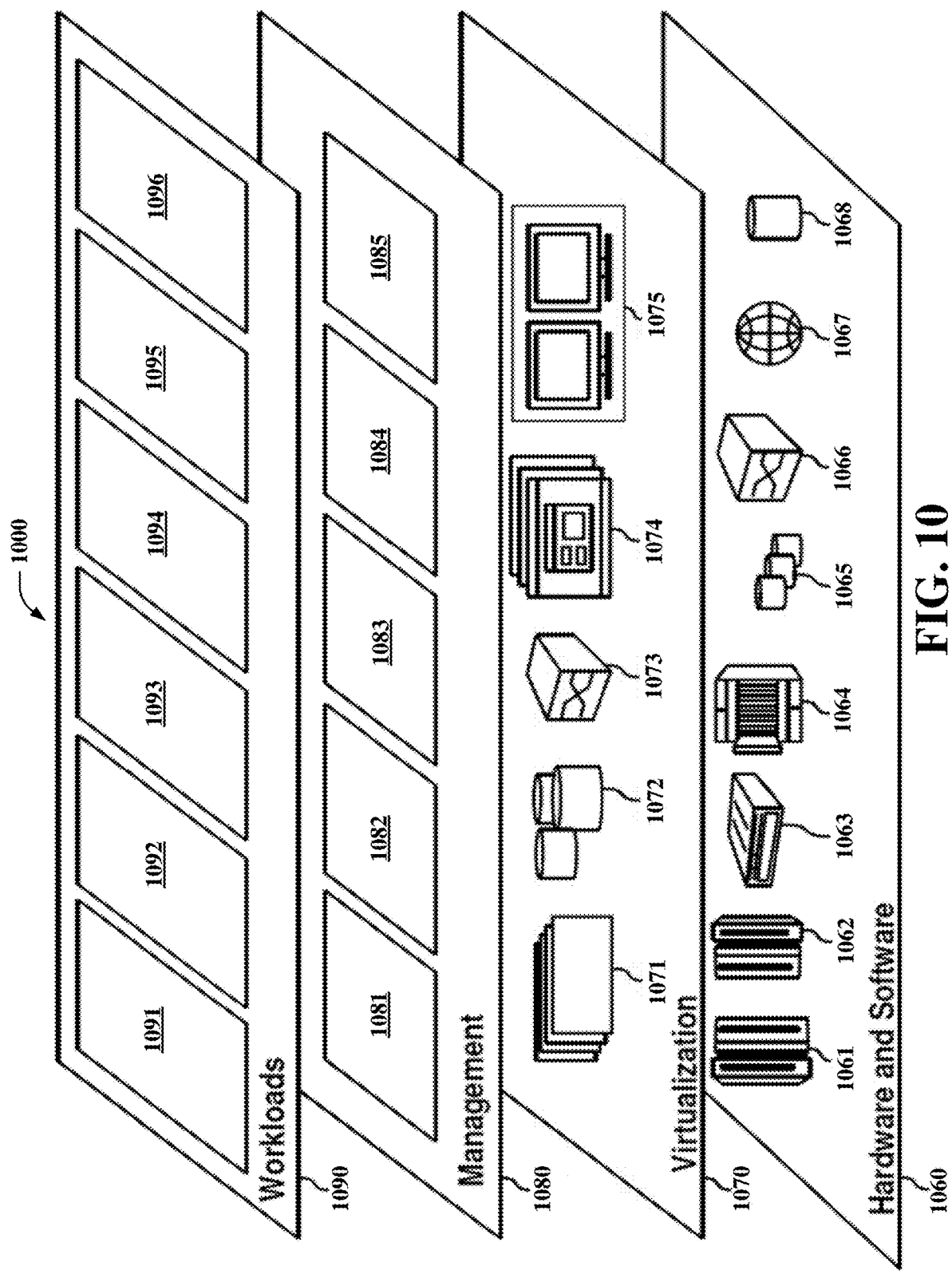
FIG. 10 illustrates a block diagram of example, non-limiting abstraction model layers in accordance with one or more embodiments described herein.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093;

data analytics processing 1094; transaction processing 1095; and depth map generation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that one or more embodiments described herein also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of one or more embodiments described herein can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components.

In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. As used herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments herein, but one of ordinary skill in the art can recognize that many further combinations and permutations of one or more embodiments described herein are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer executable components stored in memory, the computer executable components comprising:
      a depth completion component that:
         generates, using a model, a first depth map from an image and sparse depth samples, wherein the model is trained using a semantic edge-weighted loss function, and wherein generating the first depth map comprises:
            generating, using a trained semantic segmentation network, respective semantic segmentation mask images of objects in the image,
            generating, using an edge detection process, respective edge images of the objects from the respective semantic segmentation mask images, and
            assigning, using the semantic edge-weighted loss function, respective weights to pixels along edges of the objects in the edge images based on an exponential density function of respective losses of the pixels; and
      a semantic mesh deformation component that performs a semantic mesh deformation process on the first depth map, using the sparse depth samples, to generate a second depth map comprising a defined image accuracy.

2. The system of claim 1, wherein the semantic mesh deformation component segments the first depth map into semantic depth maps according to semantic segmentation mask images.

3. The system of claim 1, wherein the semantic mesh deformation component projects semantic depth maps segmented from the first depth map into a multi-dimensional space and groups projected semantic depth maps according to segmentation results of the first depth map.

4. The system of claim 1, wherein the semantic mesh deformation component reconstructs a mesh of an object in the image and calibrates the mesh independently from one or more second reconstructed meshes of one or more second objects in the image to calibrate at least one pixel in the first depth map and generate the second depth map comprising the defined image accuracy, thereby facilitating at least one of improved accuracy, improved efficiency, or reduced processing workload associated with at least one of the depth completion component, the model, or the processor in predicting or generating a depth map.

5. The system of claim 1, wherein the semantic mesh deformation component deforms at least one of: a reconstructed mesh of an object in the image to corresponding sparse depth samples of the object; or one or more second reconstructed meshes of one or more second objects in the image to corresponding second sparse depth samples of the one or more second objects.

6. The system of claim 5, wherein the semantic mesh deformation component projects at least one of a deformed reconstructed mesh of the object or one or more second deformed reconstructed meshes of the one or more second objects to a multi-dimensional space to generate the second depth map.

7. The system of claim 1, wherein the edge detection process comprises a Canny edge detection process.

8. A computer-implemented method, comprising:
   generating, by a system operatively coupled to a processor, using a model, a first depth map from an image and sparse depth samples, wherein the model is trained using a semantic edge-weighted loss function, and wherein generating the first depth map comprises:
      generating, using a trained semantic segmentation network, respective semantic segmentation mask images of objects in the image,
      generating, using an edge detection process, respective edge images of the objects from the respective semantic segmentation mask images, and
      assigning, using the semantic edge-weighted loss function, respective weights to pixels along edges of the objects in the edge images based on an exponential density function of respective losses of the pixels; and
   performing, by the system, a semantic mesh deformation process on the first depth map, using the sparse depth samples, to generate a second depth map comprising a defined image accuracy.

9. The computer-implemented method of claim 8, further comprising:
   segmenting, by the system, the first depth map into semantic depth maps according to semantic segmentation mask images.

10. The computer-implemented method of claim 8, further comprising:
    projecting, by the system, semantic depth maps segmented from the first depth map into a multi-dimensional space; and
    grouping, by the system, projected semantic depth maps according to segmentation results of the first depth map.

11. The computer-implemented method of claim 8, further comprising:
    reconstructing, by the system, a mesh of an object in the image; and
    calibrating, by the system, the mesh independently from one or more second reconstructed meshes of one or more second objects in the image to calibrate at least one pixel in the first depth map and generate the second depth map comprising the defined image accuracy, thereby facilitating at least one of improved accuracy, improved efficiency, or reduced processing workload associated with at least one of the model or the processor in predicting or generating a depth map.

12. The computer-implemented method of claim 8, further comprising:
deforming, by the system, at least one of: a reconstructed mesh of an object in the image to corresponding sparse depth samples of the object; or one or more second reconstructed meshes of one or more second objects in the image to corresponding second sparse depth samples of the one or more second objects.

13. The computer-implemented method of claim 12, further comprising:
projecting, by the system, at least one of a deformed reconstructed mesh of the object or one or more second deformed reconstructed meshes of the one or more second objects to a multi-dimensional space to generate the second depth map.

14. A non-transitory computer readable medium comprising program instructions embodied therewith, the program instructions executable by a processor to cause the processor to:
generate, using a model, a first depth map from an image and sparse depth samples, wherein the model is trained using a semantic edge-weighted loss function, and wherein generating the first depth map comprises:
generating, using a trained semantic segmentation network, respective semantic segmentation mask images of objects in the image,
generating, using an edge detection process, respective edge images of the objects from the respective semantic segmentation mask images, and
assigning, using the semantic edge-weighted loss function, respective weights to pixels along edges of the objects in the edge images based on an exponential density function of respective losses of the pixels; and
perform a semantic mesh deformation process, using the sparse depth samples, to generate a second depth map comprising a defined image accuracy.

15. The non-transitory computer readable medium of claim 14, wherein the edge detection process comprises a Canny edge detection process.

16. The non-transitory computer readable medium of claim 15, wherein the program instructions are further executable by the processor to cause the processor to:
segment the first depth map into semantic depth maps according to semantic segmentation mask images.

17. The non-transitory computer readable medium of claim 15, wherein the program instructions are further executable by the processor to cause the processor to:
project semantic depth maps segmented from the first depth map into a multi-dimensional space; and
group projected semantic depth maps according to segmentation results of the first depth map.

18. The non-transitory computer readable medium of claim 15, wherein the program instructions are further executable by the processor to cause the processor to:
reconstruct a mesh of an object in the image; and
calibrate the mesh independently from one or more second reconstructed meshes of one or more second objects in the image to calibrate at least one pixel in the first depth map and generate the second depth map comprising the defined image accuracy, thereby facilitating at least one of improved accuracy, improved efficiency, or reduced processing workload associated with at least one of the model or the processor in predicting or generating a depth map.

19. The non-transitory computer readable medium of claim 15, wherein the program instructions are further executable by the processor to cause the processor to:
deform at least one of: a reconstructed mesh of an object in the image to corresponding sparse depth samples of the object; or one or more second reconstructed meshes of one or more second objects in the image to corresponding second sparse depth samples of the one or more second objects.

20. The computer-implemented method of claim 8, wherein the edge detection process comprises a Canny edge detection process.

* * * * *